United States Patent
Lloyd et al.

(10) Patent No.: US 11,379,241 B2
(45) Date of Patent: Jul. 5, 2022

(54) HANDLING OVERSIZE STORE TO LOAD FORWARDING IN A PROCESSOR

(71) Applicant: International Business Machines Corporation, Armonk, NY (US)

(72) Inventors: Bryan Lloyd, Austin, TX (US); Brian Chen, Austin, TX (US); Kimberly M. Fernsler, Cedar Park, TX (US); Robert A. Cordes, Austin, TX (US); David A. Hrusecky, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 16/943,408

(22) Filed: Jul. 30, 2020

(65) Prior Publication Data

US 2022/0035631 A1 Feb. 3, 2022

(51) Int. Cl.
*G06F 9/38* (2018.01)
*G06F 9/30* (2018.01)

(52) U.S. Cl.
CPC ........ *G06F 9/3834* (2013.01); *G06F 9/30043* (2013.01)

(58) Field of Classification Search
CPC ............... G06F 9/3834; G06F 9/30043; G06F 9/30149; G06F 9/30098; G06F 9/30112
See application file for complete search history.

(56) References Cited

U.S. PATENT DOCUMENTS

| | | | | |
|---|---|---|---|---|
| 6,141,747 A | * | 10/2000 | Witt | G06F 9/3826 |
| | | | | 712/225 |
| 6,523,109 B1 | * | 2/2003 | Meier | G06F 9/30043 |
| | | | | 711/123 |
| 6,542,984 B1 | | 4/2003 | Keller et al. | |
| 6,564,315 B1 | | 5/2003 | Keller et al. | |
| 6,622,235 B1 | | 9/2003 | Keller et al. | |
| 8,458,442 B2 | | 6/2013 | Eichenberger et al. | |
| 2009/0164763 A1 | * | 6/2009 | Sperber | G06F 9/3808 |
| | | | | 712/225 |

(Continued)

OTHER PUBLICATIONS

Advanced Micro Devices."AMD64 Technology: AMD64 Architecture Programmer's Manual. vol. 1: Application Programming." AMD. Publication No. 24592, Rev. 3.22. Dec. 2017. 390 pages.

(Continued)

*Primary Examiner* — Courtney P Carmichael-Moody
(74) *Attorney, Agent, or Firm* — Scully, Scott, Murphy & Presser, P.C.

(57) ABSTRACT

System includes at least one computer processor having a load store execution unit (LSU) for processing load and store instructions, wherein the LSU includes (a) a store queue having a plurality of entries for storing data, each store queue entry having a data field for storing the data, the data field having a width for storing the data; and (b) a gather buffer for holding data, wherein the processor is configured to: process oversize data larger than the width of the data field of the store queue, and process an oversize load instruction for oversize data by executing two passes through the LSU, a first pass through the LSU configured to store a first portion of the oversize data in the gather buffer and a second pass through the LSU configured to merge the first portion of the oversize data with a second portion of the oversize data.

19 Claims, 6 Drawing Sheets

(56) References Cited

U.S. PATENT DOCUMENTS

| | | | | |
|---|---|---|---|---|
| 2012/0137109 A1* | 5/2012 | Ramani | ................ | G06F 9/3834 |
| | | | | 712/216 |
| 2014/0143471 A1* | 5/2014 | Moyer | ................... | G06F 12/04 |
| | | | | 710/310 |
| 2019/0108022 A1* | 4/2019 | Lloyd | ................... | G06F 9/3824 |

OTHER PUBLICATIONS

Shum, K.C. "IBM Z/ LinuxONE System Processor Optimization Primer." IBM z Systems. Jan. 2018. vol. 2. 68 pages.

Advanced Micro Devices. "Software Optimization Guide for AMD Family 10h Processors" AMD. Publication No. 40546, Rev. 3.09. Nov. 2008. 336 pages.

Anonymous. "Analytics for Intelligent HTTP Request Routing." IP.com, IPCOM000246659D. Jun. 24, 2016, 3 pages.

Anonymous. "System For Reducing Incorrect Store Forwarding Due to Aliasing." IP.com, IPCOM000236416D. Apr. 24, 2014, 4 pages.

Anonymous. "Method for Store-Load Forwarding in a Single Stage with Store Prevalidation " IP.com, IPCOM000033800D. Dec. 28, 2004, 4 pages.

* cited by examiner

HANDLING OVERSIZE STORE TO LOAD FORWARDING IN A PROCESSOR

BACKGROUND OF INVENTION

The present invention generally relates to information handling and data processing systems, processors, and more specifically to handling store and load operations in a processor.

Modern information and data handling systems often execute instructions out of order to achieve greater processing efficiency. Processors typically are "pipelined" to handle executing instructions out-of-order and have multiple elements that operate in parallel to process multiple instructions in a single processing cycle. Pipelining involves processing instructions in stages, so that the pipelined stages may process a number of instructions concurrently. Executing instructions out-of-order creates additional complexity in handling and processing instructions. Depending upon how the instructions are handled in out-of-order processors, processor latency and inefficiency may result.

Typically, the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues to hold data, information and/or instructions for the execution units.

An execution slice may refer to a set of data processing circuitry or hardware units connected in series within a processor core. An execution slice may be a pipeline or pipeline-like structure. Multiple execution slices may be used as part of simultaneous multi-threading within a processor core. In modern computer architecture, there can be multiple execution units within an execution slice including load-store units (LSUs), vector-scalar units (VSUs), arithmetic logic units (ALUs), among other execution units. A LSU typically contains one or more store queues each having entries to track store instructions and hold store data, and one or more load queues each having entries to track load instructions and hold load data. Handling data in, and sizing the store and load queues entries can be problematic, particularly for oversize store and load data.

SUMMARY

The summary of the disclosure is given to aid understanding of a computer system, computer architectural structure, processor, store queues, and method of storing and loading data and using store queues in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, store queues, and their method of operation to achieve different effects.

A technique, method, processor, and/or computer system for processing information, including oversize stores and loads, including store forwarding operations are disclosed. In one or more embodiments the method and/or computer system includes at least one computer processor having a load store execution unit (LSU) for processing load and store instructions, wherein the LSU includes (a) a store queue having a plurality of entries for storing data, each store queue entry having a data field for storing the data, the data field having a width for storing the data; and (b) a gather buffer for holding data, wherein the processor is configured to: process oversize data larger than the width of the data field of the store queue, and process an oversize load instruction for oversize data by executing two passes through the LSU, a first pass through the LSU configured to store a first portion of the oversize data in the gather buffer and a second pass through the LSU configured to merge the first portion of the oversize data with a second portion of the oversize data. In an aspect, the processor is further configured to store the oversize data in at least two consecutive entries in the store queue. The processor is further configured so that the data field of the store queue is half a size of the oversize data capable of being processed by the processor, the processor configured to simultaneously store the oversize data in at least two entries in the store queue. The processor in one or more aspects is further configured to obtain a copy of the first portion of the oversize data from a first entry of the plurality of entries in the store queue during a first pass through the LSU, and move the copy of the first portion of the oversize data to the gather buffer during the first pass through the LSU. The processor in a further aspect is configured to obtain a copy of the second portion of the oversize data from a second entry of the plurality of entries in the store queue during a second pass through the LSU, and merge during the second pass through the LSU the copy of the second portion of the oversize data with the first portion of the oversize data from the gather buffer.

The LSU in an embodiment further includes a Load Launch Queue (LLQ), the LLQ having circuitry and logic for tracking and controlling load operations in the LSU, the LLQ configured to control the two passes through the LSU. The processor is further configured to detect oversize load instructions for oversize data that is larger than the width of the data field in the store queue, and determine, in response to detecting an oversize load instruction, whether the store queue contains any of the oversize data. The processor in a further aspect is configured to determine, in response to the store queue containing any of the oversize data, whether a first store queue entry in the plurality of store queue entries contains all of the first portion of the oversize data, and obtain, in response to the first store queue entry containing all of the first portion of the oversize data, the first portion of the oversize data from the first store queue entry. In an embodiment, the processor is further configured to determine whether a second store queue entry of the plurality of store queue entries contains all of the second portion of the oversize data, and obtain, in response to the second store queue entry containing all of the second portion of the oversize data, the second portion of the oversize data from the second store queue entry. In an aspect, the processor is further configured to compare memory address information in each of the store queue entries with the memory address contained within the oversize load to determine whether any store queue entry contains any of the oversize data.

A method of processing data in a processor is also disclosed that includes: detecting an oversize load instruction for oversize data that is larger than the width of a data field in a store queue; determining, in response to detecting an oversize load instruction, whether the store queue contains any of the oversize data; determining, in response to the store queue containing any of the oversize data, whether a first store queue entry contains all of a first portion of the oversize data; obtaining, in response to a first store queue entry containing all of a first portion of the oversize data, the first portion of the oversize data from the first store queue entry; storing the first portion of the oversize data from the store queue entry into a gather buffer; and merging the first portion of the oversize data from the gather buffer with a second portion of the oversize data. Merging the first portion of the oversize data from the gather buffer with a second portion of the oversize data in an embodiment includes determining whether a second store queue entry contains all of the second portion of the oversize data; and obtaining, in response to a second store queue entry containing all of the second portion of the oversize data, the second portion of the oversize data from the second store queue entry. Determining whether the store queue contains any of the oversize data includes in an embodiment comparing memory address information in each of the store queue entries with the memory address referred to in the oversize load instruction. Comparing the memory address information in each of the store queue entries with the memory address referred to in the oversize load instruction includes in an aspect determining whether a store start address and a store end address of each store queue entry falls within an oversize load start address and an oversize load end address of the oversize load instruction. In one or more embodiments, the first portion of the oversize data is obtained from the store queue by a first pass through a load store unit (LSU) and the second portion of the oversize load is obtained by a second pass through the LSU.

In an aspect, programming instructions are stored on one or more computer readable non-transitory storage media for execution by the at least one processor, the programming instructions including instructions that when executed cause the processor to: process oversize data larger than the width of the data field of the store queue; store oversize data in at least two consecutive entries in the store queue; and process an oversize load instruction for oversize data by executing two passes through the LSU, a first pass through the LSU to store a first half of the oversize data in the gather buffer and a second pass through the LSU to merge the first half of the oversize data from the gather buffer with a second half of the oversize data obtained by the second pass through the LSU.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and/or embodiments of the information handling system, computer system, computer architectural structure, processor, queues (e.g., store queues), and their method of operation will be better understood when read in conjunction with the figures provided. Embodiments are provided in the figures for the purpose of illustrating aspects, features, and/or various embodiments of the computer system, computer architectural structure, processor, queues, (e.g., store queues) and their method of operation, but the claims should not be limited to the precise arrangement, structures, features, aspects, embodiments, and/or devices shown, and the arrangements, structures, subassemblies, features, aspects, methods, processes, embodiments, methods, and/or devices shown may be used singularly or in combination with other arrangements, structures, subassemblies, features, aspects, embodiments, methods, and/or devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, execution units such as, for example, a load store unit (LSU), load queues (LDQ), and store reorder queues (SRQs), also referred to as store queues (STQ), and their method of operation, however, it will be understood by those skilled in the art that different and numerous embodiments of the computer system, computer architectural structure, processor, processor pipelines, load store units (LSUs), load and store reorder queues (SRQs), and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" when used in this specification, specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processor and microprocessor systems, architectures, and/or pipelines, which are apparent to those skilled in the art. It is assumed that those skilled in the art are familiar with the general architecture of processors, and in particular with processors which operate in an out-of-order execution fashion, including multi-slice processors and their use of execution units such as load store units (LSUs), and store reorder queues. It may be noted that a numbered element is numbered according to the figure in which the element is introduced, and is typically referred to by that number throughout succeeding figures.

Figure 1:
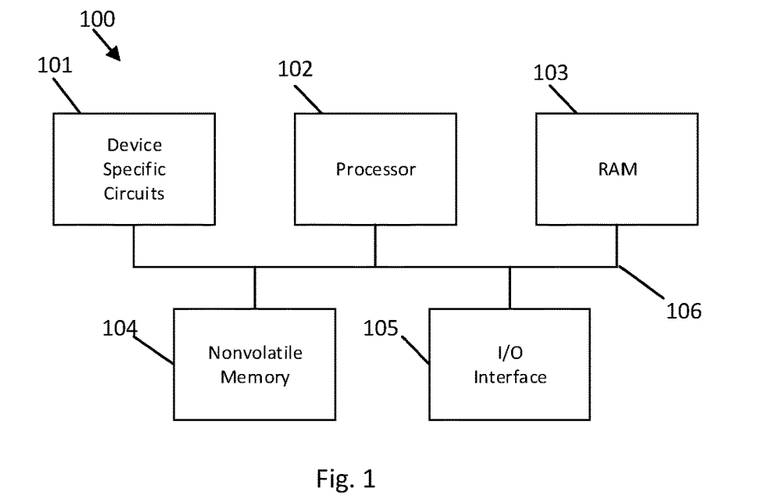
FIG. 1 illustrates an example of a data processing or information handling system in which aspects of the present disclosure may be practiced.

A computing or information handling (data processing) system 100 suitable for storing and/or executing program code may take many forms and in one embodiment may include at least one processor 102, which may be or be part of a controller, coupled directly or indirectly to memory devices or elements through a system bus 106, as shown in FIG. 1. Computing or information handling system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM. In one embodiment, the RAM 103 may comprise Double Data Rate (DDR) synchronous DRAM or SDRAM. The RAM 103 may include memory devices arranged on a module, such as, for example, Dual Inline Memory Modules, also known as DIMMs.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as, for example, Automation/Drive Interface (ADI).

Figure 2:
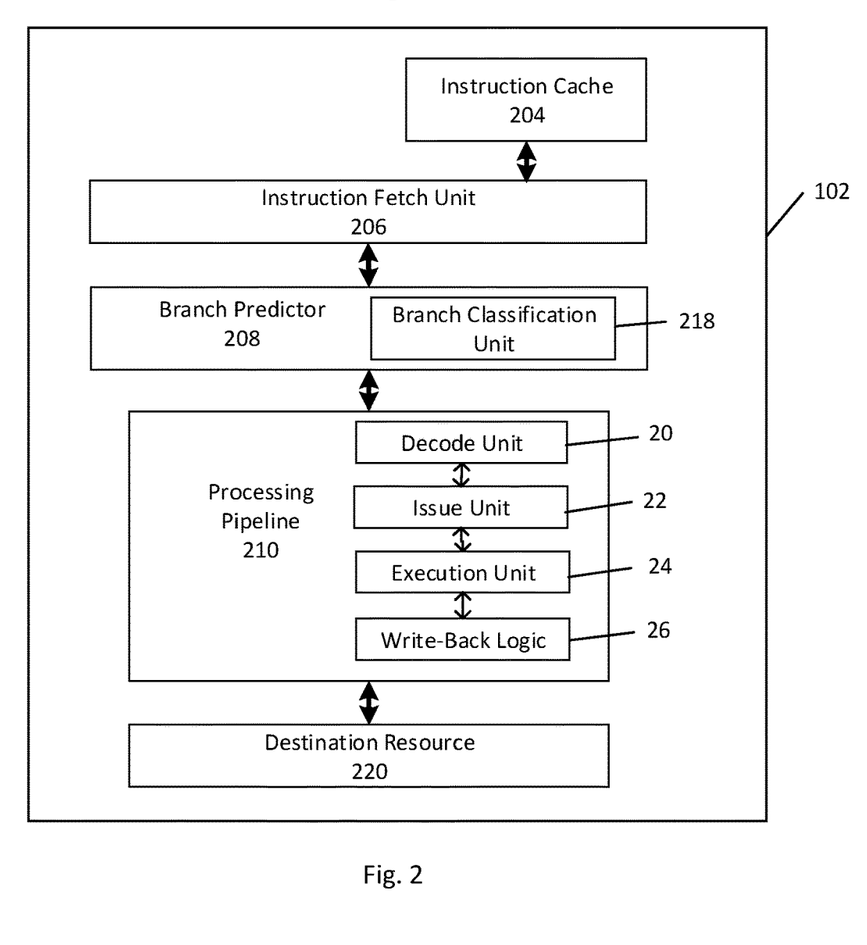
FIG. 2 illustrates a block diagram of a processor in which certain aspects of the present disclosure may be practiced.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102. The processor core may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may include a dispatch unit to dispatch instructions to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The execution unit 24 performs and executes operations specified by the instructions issued to the execution unit 24. The execution unit 24 may include a plurality of execution units, such as fixed-point execution units, floating-point execution units, load/store execution units, and vector scalar execution units. Execution unit 24 in addition, in embodiments, determines if the predicted branch direction is incorrect. When a mispredicted branch instruction is detected, instructions subsequent to the mispredicted branch are discarded (e.g., flushed) from the various units of processor 102.

The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 102 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a CPU 110 may have multiple execution/processing/pipeline slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor.

Figure 3:
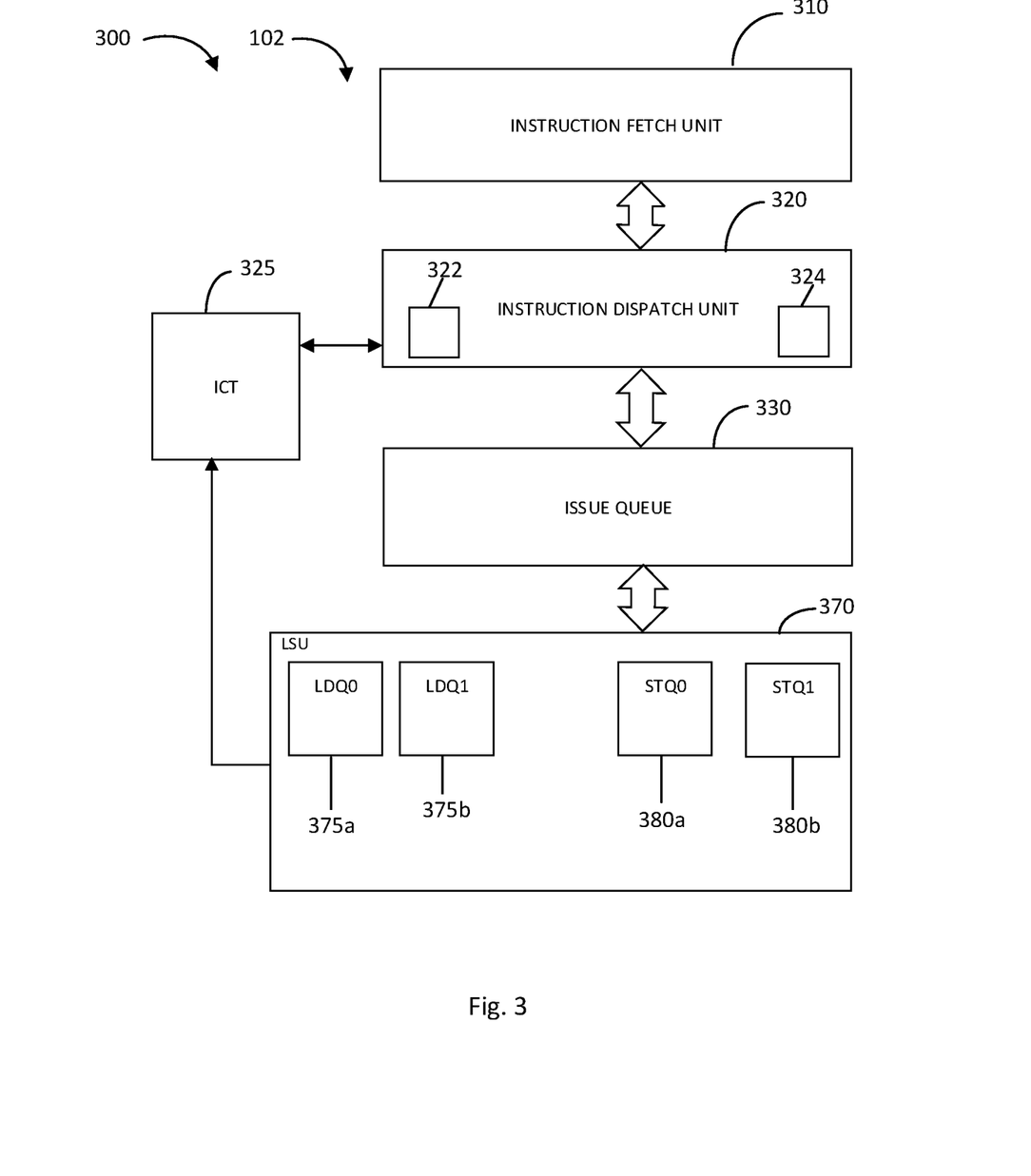
FIG. 3 illustrates a block diagram of a processor pipeline in accordance with an aspect of the disclosure in which certain aspects of the present disclosure may be practiced.

FIG. 3 illustrates a block diagram of a portion of a pipeline 300 in processor 102. The pipeline 300 in FIG. 3 includes Instruction Fetch Unit 310, Instruction Dispatch Unit 320, Issue Queue (ISQ) 330, Instruction Completion Table (ICT) 325, and Load Store Unit (LSU) 370. Although not shown, pipeline 300 may also include a vector scalar execution unit (VSU), among other execution units. The LSU 370 includes one or more load queues (LDQ) 375 that hold load instructions and load data for execution by LSU 370, and one or more store reorder queues (SRQs) 380, also referred to as store queues (SRQ), that hold store instructions and store data for execution by LSU 370. The store queue (SRQ) entries and load queue (LDQ) entries are typically assigned (allocated) in program order generally at dispatch, e.g., by the dispatch unit 320, if the entries in the queues are available. Store queue (SRQ) entries typically are freed up (deallocated) when the store instructions have executed and the stores have drained into the L1 processor cache (and/or the L2 processor cache). Load queue (LDQ) entries typically have freed up (deallocated) when the loads have completed (retired) and have entirely executed within the processor core.

In the embodiment of FIG. 3, the load queue (LDQ) 375 has two load queues LDQ0 (375a) and LDQ1 (375b), and the store reorder queue (SRQ) 380 has two store queues, SRQ0 (380a) and SRQ1 (380b). More or less load queues 375 and/or store queues 380 may be present in LSU 370, and the load queues (LDQ) and store queues (SRQ) may be designed and configured to have varying amounts of entries. For example, in an embodiment, load queues (LDQ) 375 may have m entries, e.g., sixty-four (64) entries, while in an embodiment, store queues (SRQ) 380 may have n entries, e.g., forty (40) entries. The entries in the load queues (LDQ) 375 and the store queues (SRQ) 380 typically have a field of a designated size to hold load or store data associated with the load or store entry.

The Instruction Fetch Unit 310 fetches instructions to be executed by the processor 102 or processor slice (processor pipeline) and sends them to the Instruction Dispatch Unit 320. The Instruction Dispatch Unit 320 dispatches instructions to the Issue Queue (ISQ) 330, typically in program order. The Issue Queue (ISQ) 330 in an embodiment will issue load instructions and store instructions to the LSU 370, and more particularly will issue load instructions to the load queue (LDQ) 375 and store instructions to the store queue (SRQ) 380 in the LSU 370. The ISQ 330 typically holds an instruction until data associated with the instruction has been retrieved and ready for use. A register file (e.g., a general purpose register (GPR), a vector scalar register (VSR), or other register (e.g., ALU)), or data cache (not shown) may serve to store data to be used in an operation specified in an instruction dispatched to an execution slice, and the result of the operation performed by execution units, e.g., LSU 370, may be written to the designated target register in the register file.

When data has been retrieved and placed in the register file or cache, e.g., L1 or L2 cache (not shown), associated with the processor 102, the Issue Queue 330 will issue the instruction to the execution unit, e.g., LSU 370, for execution. Issue Queue 330 typically issues the instruction to the execution unit if an entry in a queue of the execution unit is available, e.g., if the store queue (SRQ) or load queue (LDQ) in the LSU has an available entry. When data is not ready, e.g., not within the appropriate data cache or register file, delay can result as the ISQ 330 will not issue the instruction to the execution unit. For at least this reason, the Issue Queue (ISQ) typically issues instructions, e.g., load instructions and store instructions, to the execution units, e.g., LSU 370, out-of-order so instructions where the required data is available can be executed.

Dispatch Unit 320 in an embodiment will stamp, e.g., assign, each load instruction in a thread that is dispatched to the Issue Queue 330 with an identifier, e.g., a load tag (ltag). The load instructions (ltags) are typically allocated and stamped in ascending program order on a per thread basis by the Dispatch Unit 320. The instructions residing in the load queue (LDQ) 375 are referred to or identified by their load tags or ltags and/or entry Nos. The Dispatch Unit 320 in an aspect contains a per thread load instruction counter 322 that increments for each load instruction dispatched to the Issue Queue 330, up to a maximum number of load instructions have been allocated and placed into the load queue (LDQ) 375 in the LSU 370. Once the maximum number of load instructions is reached, the Dispatch Unit 320 typically stalls at the next load instruction until the load queue (LDQ) 375 has deallocated an entry.

When LSU 370 is available it will execute the load instructions in the load queue (LDQ) 375. The LSU 370 executes load instructions out-of-order and when the LSU 370 finishes a load instruction (ltag), the LSU 370 will report the finished load instruction, e.g., ltag, to Instruction Completion Table (ICT) 325. The ICT 325 completes the load instructions in order. Each entry in the ICT 325 in an embodiment has a field to indicate that an instruction is a load instruction or a store instruction. When the ICT 325 completes one or more load instructions, the ICT 325 reports to the Dispatch Unit 320 the number of ICT entries that have the load bit and are completed.

Dispatch Unit 320 in an embodiment will stamp e.g., assign, each store instruction in a thread that is dispatched to the Issue Queue 330 with an identifier, e.g., a store tag (stag). The store instructions (stags) typically are allocated (assigned) and stamped in ascending program order on a per thread basis by the Dispatch Unit 320. The instructions residing in the store queue (SRQ) are referred to or identified by their store tags or stags or store queue entry No. Dispatch Unit 320 also contains and maintains a per thread store instruction counter 324 that increments for each store instruction (stag) in a thread that is dispatched to the Issue Queue 330, up to a maximum number of store instructions for that thread have been allocated for or placed into the store reorder queue 380 in the LSU 370. Once the number of store instructions (e.g., stags) that can fit into the SRQ 380 have been dispatched by the Instruction Dispatch Unit, the Instruction Dispatch Unit 320 typically stalls at the next store instruction until the SRQ 380 in an aspect has deallocated a store instruction entry in the SRQ 380.

When LSU 370 is available it will execute the store instructions in the store queue (SRQ) 380. The LSU 370 executes store instructions out-of-order and when the LSU 370 finishes a store instruction (stag), the LSU 370 will report the finished store instruction, e.g., stag, to Instruction Completion Table (ICT) 325. The store instruction in the store queue (SRQ) 380 in one or more embodiments is considered finished based upon various criteria, including, for example, after the LSU drains the result of the store instruction (e.g., the stag) into memory, e.g., L1 and/or L2 cache.

The ICT 325 contains a queue of the instructions dispatched by the Dispatch Unit 320 and tracks the progress of the instructions as they are processed. In an embodiment, the ICT 325 has a per thread completion tail pointer that keeps track of the progress of executing the instructions in the thread, e.g., a pointer that points to the next-to-complete (NTC) instruction in the thread. The ICT 325 may store and track information on the instructions processed by the processor, including, for example, the type of instruction (e.g., a store or load instruction), whether the instruction is finished, whether the instruction is ready-to-complete (RTC), and/or other information.

The size of the data field, e.g., the width of the field holding data, in the respective load queues (LDQ) and store queues (STQ) affects the performance and efficiency of the processor. Defining and/or configuring the data width, e.g., the width of the field holding the data, for each entry in the load queues and store queues to be the same size as the maximum size load or store operation defined by the ISA is inefficient in terms of hardware implementation cost if the maximum sized load and store operations in the ISA are not the predominant load and store operations in the processor. Thus it can be more efficient to include data fields in the load and store queues that are not as large as the load and store operations handled by the processor. It can be advantageous to include load queues and store queues whose data fields are smaller than the load and store operations capable of being handled by the processor. Processing oversize load and store data, e.g., load and store data larger (wider) than the data field in the respective load or store queue, however, can be problematic.

For a given thread, if a load instruction that is younger than the store instruction in program order is issued to the LSU 370, the load instruction, as is typically required by memory ordering rules of any instruction set architecture (ISA), should return data from memory that reflects all older stores of that thread. If the load instruction is issued at such a time that the youngest address residing in SRQ entry containing a valid address and data is older than the load instruction, rather than waiting for the store instruction to complete and be sent all the way to coherent memory, the processor may instead immediately return load result data directly from reading that SRQ entry. This is commonly known as store-forwarding. Processing oversize store-forwarding operations can also be problematic. The dataflow required to process store-forward operations becomes very costly if the load data is oversized, i.e., larger than the data field in the respective load and store queues. It is very costly to increase the width and support for oversized dataflow in the timing critical area of load instruction execution dataflow.

Disclosed is a technique, method, processor, and/or system for handling and processing oversized store and load operations, including in one or more aspects store-forwarding operations. Rather than including a store queue that has an entry data width and store-forwarding dataflow width to support the relatively few maximum sized load and store operations handled by the processor and/or system, the store queue (SRQ) entry data width and store-forwarding dataflow width are organized into smaller data entry sizes. So for example, rather than double the SRQ entry data width and store-forwarding dataflow width just to support the relatively few maximum-sized byte loads and stores defined in the ISA (e.g., thirty-two (32) byte wide loads and stores), the SRQ is organized into data entries that are smaller in size, (e.g., half the width/size, for example, sixteen (16) bytes wide) with supporting store-forwarding dataflow also smaller in size, e.g., half the width/size (e.g., sixteen (16) bytes wide).

To support store-forwarding to an oversized load (e.g., octword (32 byte) load), in one or more embodiments, an oversize store (e.g., octword store) will be stored in two (2) SRQ entries, preferably two consecutive SRQ entries. That is, the data for an oversized store is written into two (2) consecutive entries in the SRQ. An oversized load in one or more embodiments is then sent through the execution pipe twice. On the first pass, the oversized load will forward data from one entry in the SRQ, and return a portion of the data (e.g., half or 16 bytes), into a Gather Buffer, preferably a dynamically allocated Gather Buffer, for temporary holding. On the second pass, the load will read the adjacent entry in the SRQ entry to access another portion, preferably the second half (e.g., the remaining 16 bytes), of the data required for the oversized load. In parallel with the second pass, the Gather Buffer will read out the Gather Buffer entry data containing the data from the first portion, e.g., 16 bytes, of the load. On the second pass, both halves of the load result will be merged (16 bytes of Gather Buffer data+16 bytes of the second store entry in the SRQ from the second pass) and a 32 byte load result will be returned for writeback into a register file. In this manner, store-forwarding is supported for widths wider than the SRQ entry (e.g., for oversize loads and stores) by using a two execution pass approach. In one or more aspects, the two execution pass approach also can be used to execute unaligned load operations that require two memory accesses, such as loads spanning multiple cachelines. The unaligned load execution can use the two passes and the Gather Buffer to temporarily store the result of the first access to memory and combine the two passes to obtain the load spanning multiple cachelines.

Figure 4:
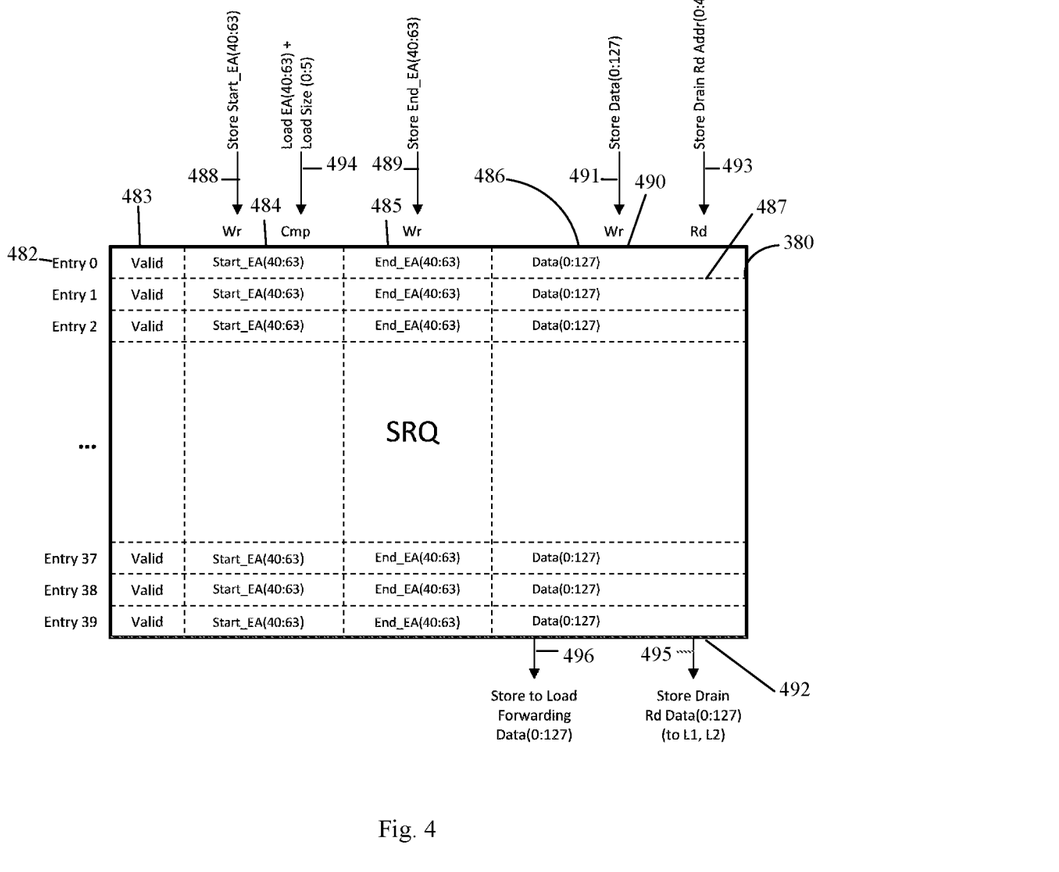
FIG. 4 illustrates a store reorder queue (SRQ) in a Load Store Unit (LSU) in accordance with an aspect of the disclosure in which certain aspects of the present disclosure may be practiced.

FIG. 4 shows an example store queue (SRQ) 380, also referred to as a store reorder queue, for use in the present disclosure. As shown in the example, store queue (SRQ) 380 has forty entries (stags) 482 as entry 0-entry 39, although more or less entries 482 are contemplated for store queue (SRQ) 380. Generally, the older store instructions are at the top and the younger store instructions proceed downward, however, the SRQ is typically a circular queue, where when the oldest entry drains and deallocates from the SRQ, it will then be reallocated as the youngest entry. So for example, the SRQ will initially be empty and then be filled with 40 stores such that entry 0 is oldest and entry 39 is youngest. Then once entry 0 drains and deallocates from the store queue, entry 1 will be the oldest and entry 0 will be reallocated with a $41^{st}$ store which is the youngest. And then once entry 1 drains and deallocates, entry 2 will be oldest, entry 0 will be $2^{nd}$ youngest and entry 1 will be reallocated with a new store and have the youngest entry.

Each entry 482 in the SRQ 380 has a valid/invalid bit field 483, one or more fields (e.g., 484, 485) to identify the address in memory (e.g., an effective address (EA)) where data is to be written, and a data field 486 that holds the store data 487. In an example embodiment, data field 486 is smaller than the data width that the processor pipeline is capable of handling, for example, 16 bytes (128 bits) wide. Other widths for data field 486 are contemplated.

In the embodiment illustrated in FIG. 4, the one or more fields identifying the address in memory where the data is to be written includes field 484 identifying where the memory address starts, e.g., effective address (EA) start, and field 485 identifying where the memory address ends, e.g., EA end. Other ways of identifying the memory address are contemplated depending upon the design of the store queue (SRQ). In addition, the store queue 380 is likely to include other fields, which for the sake of brevity are not described here. The store queue 380 includes one or more write ports 490 to write data to the store queue 380 and one or more read ports 492 to read data from the store queue 380. One or more inputs are transmitted through the one or more write port(s) 490, including, for example, an input 488 for the store start address (store start_EA), an input 389 for the store end address (store end_EA), an input 491 for the store data, an input 493 for the store drain read address (store drain Rd Addr), and an input 394 for the load address (load EA) and load size (for comparisons to find matching entries in the store queue). Other inputs can be processed through the one or more write port(s) 490. One or more outputs are transmitted through the one or more read port(s) 492, including, for example, output 495 for store drain read data (store Drain Rd data) to the L1/L2 cache, and output 496 for store to load forwarding data. Other outputs can be handled through the one or more read port(s) 492.

As indicated above, the processor is configured to handle oversize load and store instructions, including oversize store-forwarding operations. That is, the processor is configured to handle load and store instructions, including store-forwarding operations, where the dataflow widths are larger than the width of the data field 486 in the store queue 380. Normally when a store address operation is issued for data that is not wider than the data field 386 of the store queue (SRQ) 380, the store queue (SRQ) 380 will write one store queue entry 482 with the store start address (EA) in field 484 and the store end address (EA) in field 485 at the same time. It will then normally write the store data into the store queue data field 486 a few cycles later when a store data operation is issued for that store queue entry 482.

In one or more embodiments, for an oversize store operation, when a store address operation is issued, the oversized store operation is handled special. In one or more embodiments, the data for oversize store operations, e.g., octword (32 byte) stores, are stored in the store queue 380 in consecutive store entries 482. In an embodiment, on processing an oversize store address operation/instruction, e.g., an octword store operation, there is an issue for a store entry that writes address information for two store entries 482, preferably two consecutive store entries 482. In an aspect, the store address operation simultaneously writes two consecutive store queue entries 482, e.g., store queue Entry X and store queue Entry X+1. In an example embodiment where the oversize store is thirty-two bytes (e.g., an octword store), the SRQ entries 482 containing an oversize (octword) store are organized as follows:

Entry (stag) X+1: start address=EA, overlap size=32, contain size=16;
Entry (stag) X: start address=EA+16, overlap size=16, contain size=16.

More specifically for SRQ 380, for an oversize store address operation, two consecutive address entries in an embodiment are simultaneously written to the store queue (SRQ):

Entry (stag) X: EA start=EA+16, EA end=EA+31;
Entry (stag) X+1: EA start=EA, EA end=EA+15.

In one or more embodiments, for processing an oversize store into Entry X and Entry X+1, only one store start EA is sent into the SRQ (EA) and one store end EA (EA+31) is sent into the SRQ. It is just within entry X and entry X+1 of a 32 byte store where the fields for the start EA is altered to write EA+16 in entry X and the end EA is altered to write EA+15 for entry X+. In an aspect, before EA start field 484 in the SRQ 380 is an entry-by-entry multiplexor (mux) with a first input to the mux of EA (the start EA), which is selected if the store is not for the first oversize store queue entry (not entry X), and a second input to the mux of EA+16, which is selected if the store is for the first oversize store queue entry (entry X). In a further aspect, before EA end field 485 is an entry-by-entry multiplexor (mux) with a first input to the mux of EA+(data width of oversize store −1), which is selected if the store is not for the second oversize store queue entry (not entry X+1), and a second input to the mux of EA+15, which is selected if the store is for the second oversize store queue entry (entry X+1). In an embodiment, an independent EA+16 "adder" is added per store queue pipe.

Figure 5:
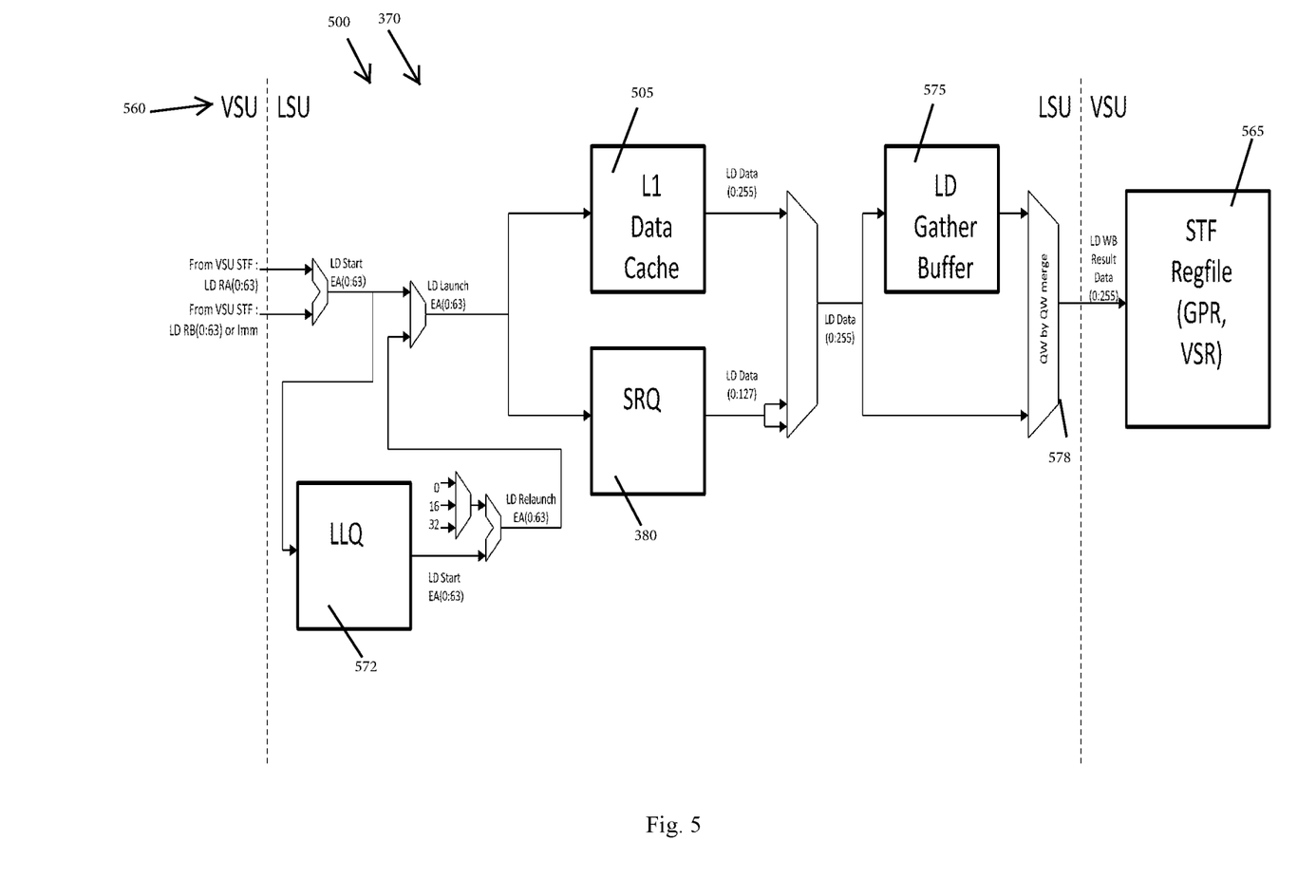
FIG. 5 illustrates a block diagram of a Load Store Unit (LSU) and part of a processor pipeline and data flow in accordance with an aspect of the disclosure in which certain aspects of the present disclosure may be practiced.

In one more embodiments, when processing an oversize store-forward operation, and in particular when handling the load operation portion of the oversize store-forward operation, the oversize load is sent through the execution pipe twice. In an aspect, during each pass through the LSU execution pipe, data from one of the store queue entries is obtained/read/forwarded for use in the load operation. FIG. 5 shows the execution pipe 500 in a processor between a vector scalar unit (VSU) 560 and LSU 370 and the dataflow for a load operation in LSU 370, including the dataflow for the load portion of an oversize store-forward operation. The LSU 370 includes a Load Launch Queue (LLQ) 572, Store Queue 380, the L1 Data Cache 505, and Load Gather Buffer 575, as well as a number of other components, including multiplexors (muxes) and arithmetic logic units (ALUs). The VSU 560 is shown for reference to show the dataflow and includes a register file 565. When processing a load operation (lstag), the store queue 380 and/or data cache 505 will be checked to determine whether or not the desired data is in one of the store queue 380 and/or data cache 505. If the data is in the store queue 380 or the data cache 505, the data will be supplied from the store queue and/or data cache 505 rather than waiting for the data to be stored in memory, and loaded back to the L1 data cache (or elsewhere in the processor).

In one or more embodiments, the store queue 380 has a data field 486 that is smaller than the maximum width of the data that is capable of being processed and handled in the processor, and more specifically, the pipeline 500 in the processor, e.g., processor 102. In an example, the data field 486 in the store queue 380 has a width of 16 bytes where the processor can handle load and store operations for data as large as 32 bytes, e.g., octword operations. Disclosed is a process, technique, processor, LSU, store queue, and/or system for processing oversize load and store operations, and in particular oversize store-forward operations.

In an embodiment, the Load Launch Queue (LLQ) 572 that tracks the load execution state within the out-of-order window for all loads will launch the load operation through the execution pipe, the LSU pipe 500 shown in FIG. 5, twice (in two phases), keeping track of which phase of the load is currently launching. On the first pass (phase 1) through the execution pipe, e.g., the execution and dataflow 500 of FIG. 5, the load will find Entry X+1 as the youngest of older ("yoo") of the oversize store in the store queue 380 and forward the second portion (16 bytes or half) of data for the oversize load from Entry X+1 in the store queue 380 to the Gather Buffer 575. The Gather Buffer 575 will temporally hold (store) the store data (the first portion/half) from the first store queue entry 482, e.g., Entry X+1. The Gather Buffer 575 can hold one or multiple entries and can hold data that is larger (has more bits) than the data held by the store queue 380. If the Gather Buffer 575 has a plurality of entries, than in an embodiment the load will be assigned a gather buffer entry on an as needed basis. The Gather Buffer 575 in an example can have six (6) entries and each entry can be thirty-two (32) bytes wide.

The Load Launch Queue 572 will advance the tracking of the load operation and will launch the load through the execution pipeline 500 the second time (phase 2). On the second pass (phase 2) through the execution pipe 500, e.g. dataflow shown in FIG. 5, the LLQ 572 will control the address generation logic to add the remaining portion and/or the other/remaining half, e.g., sixteen (16) bytes to the load address (change the start address and end address) and also change the size of the load, preferably simultaneously change the size of the load. The load will find (hit) the Entry X, get another portion (the remaining portion, and/or the other/remaining half) of the data for the oversize load from Entry X, and merge this data at merge 578 with the data, e.g., 16 bytes, that was provided to and temporally stored in the Gather Buffer 575 from the store queue Entry X+1. The oversize load will include data from store queue Entry X and consecutive, adjacent store queue Entry X+1. For the octword store to load forwarding where the gather buffer holds sixteen bytes a quadword merge is used. On the second pass execution, the 16 bytes obtained on the second pass from the store queue are placed on the final load result writeback bus in the correct byte positions. The 16 bytes from the Gather Buffer 575 are simultaneously placed in the correct byte positions where they should be on the final 32 byte load result writeback bus. The oversize load, upon successful handling of the second pass (phase 2), will finish and provide a thirty-two (32) byte result, which can in an aspect be written back, e.g., to the register file 565 in the VSU 560.

Turning to some specifics in an exemplary embodiment where an octword (32 byte) load is handled in an LSU, where the data pipeline, and more specifically where the store queue, has a data width that is smaller (e.g., sixteen bytes) than the data capable of being processed by the processor. The system/process in an embodiment is configured to first obtain a first part or half of the data for the load from store queue Entry X+1 during a first phase or pass through the LSU pipeline, and is configured to obtain another part or half of the data for the load from the store queue Entry X in the second phase or pass through the LSU pipe.

In one or more embodiments, in response to receiving a load instruction for oversized data, the system/process will check to determine whether or not the data for the oversize load operation resides in the store queue 380. In one or more embodiments, the store queue 380 is searched for the data corresponding to the oversize load. Typically the search is performed by a comparison process. To search the store queue 380 for the oversize load data, the start address (EA) for the search of the store queue 380 is set to the start address (EA) of the load, e.g., original EA for the oversize load, and the load size is set to the oversize load, in this example 32 bytes. In an embodiment the end address (EA) is set to the EA+31 (for an octword load). In an aspect, a store start overlap compare is performed to see if any entry 482 in the store queue 380 contains any portion of the oversize load, e.g., any of the thirty-two (32) bytes of the load. That is, in the example, the load size is treated as 32 bytes and the store queue 380 is checked to see if any store queue entry 482 has any part of the thirty-two (32) bytes of the load. In other words, each store queue entry is checked to determine whether the start address (EA_start) and end address (EA_end) in the store queue entries is within the address range for the oversize load.

The system/process, in response to the store queue 380 having one or more entries 482 containing any portion of the desired load data, checks, in an aspect, the youngest one of the store queue entries 482 to determine whether that youngest store queue entry 482 has all the bytes of the load, and in an embodiment whether the store queue entry 482 contains all sixteen (16) bytes of one or more of the portions, e.g., a first portion/half, of the requested oversize load. It checks the youngest of the store queue entries has all the data required for the first 16 bytes of the load. In an embodiment, to search the store queue 380 to determine whether a store queue entry 482 has all the data for a first portion of the oversize load, each entry 482 in the store queue 380 is searched. In an embodiment, the start address (EA-start) for the search of the store queue 380 is set to the address (EA) of the load, e.g., original EA for the oversize load, and the load size is set to the size of the desired portion (half) of the oversize load, in this example 16 bytes. In an embodiment, the end address (EA_end) for the search is set to EA+15 bytes (where the data field 384 is 16 bytes). In an aspect, a store end contain compare is performed to see if any entry 482 in the store queue 380 contains all the bytes of the first portion (half) of the oversize load, e.g., all sixteen (16) bytes of the desired portion (half) of the oversize load. That is, in the example, the load size is treated as 16 bytes and the store queue 380 is checked to see if any store queue entry 482 has all 16 bytes of the first portion (half) of the desired oversize load. So for example, you could have in theory a match against three SRQ entries 482. Store queue Entry X is an octword store entry with start_EA=EA+16/end_EA=EA+31 and store queue Entry X+1 is an octword store entry (for the same octword store) with start_EA=EA/end_EA=EA+15. And some younger entry, for example Entry X+5 is a standalone 16 byte store with start_EA=EA/end_EA=EA+15. If all three stores are older than the load, the load will match against all three stores with Entry X+5 being the youngest of the stores. Since Entry X+5 has all of the data required by the first half of the oversized load, the data will forward successfully from Entry X+5.

In one or more embodiments, upon or in response to the desired load data residing in the store queue 380 and upon detecting an oversize load, (e.g., if load hit store (lhs)_any), and if the youngest of the oldest ("yoo") entry (e.g., Entry X+1) contains the desired load data, a load gather buffer (LGB) entry is allocated. That is, in an embodiment where the store queue 380 has two store queue entries 482 containing the desired load data, and the yoo Entry X+1 contains all the data for the first portion or half of the desired load data, a LGB entry is allocated by the Load Launch Queue 572. Upon or in response to the LGB entry allocation, a first pass is made through the data flow pipeline 500 to obtain the data 487 residing in yoo store queue entry 482 (Entry X+1), and the data 487 from yoo Entry X+1 is forwarded into the Load Gather Buffer 575. In an aspect, in response to the data 487 being loaded into the Load Gather Buffer 575, a signal reports that the first phase/pass of the oversize load is done.

A second pass through the pipeline 500 is performed to obtain another portion, e.g., the second half (Entry X) for the oversize load from the store queue 380. To obtain the second portion or second half of the oversize load from the store queue 380, e.g., to obtain the data from Entry X, the start EA for the load launch is set to the EA of the load plus sixteen (16) bytes, e.g., original EA+16, and the load size is set to sixteen (16) bytes so that the end address (EA_end) is set at EA+31 and a store start overlap compare is performed to see if any entry has any part of the sixteen bytes of the desired load. The load size is also set to sixteen (16) bytes so that the load end is set at EA+31 and a store end contain compare is performed to see is any one of the store queue entries 482 contains all the bytes of the second portion (second half) of the desired oversize load. That is a comparison is performed to see if a store queue entry, e.g., Entry X, contains a desired second portion of the oversize load data. The second pass/ phase can forward the data from the store queue entry 482 that hits on the comparisons, e.g., forward Entry X.

In one or more embodiments, if the second portion/half of the desired oversize load is not in the store queue 380, the data can still reside and hit in the L1 Data Cache 505, and data can be forwarded from the L1 Data Cache 505. The data corresponding to the second portion/half of the desired oversize load can also miss in the store queue 380, and miss in the L1 Data Cache 505, in which case the data will be retrieved from memory into the L1 Data Cache 505 or elsewhere. The second portion (half) of the data obtained from the store queue 380 or the L1 Data Cache 505 will be merged by the byte-by-byte merge 578 with the data from the Load Gather Buffer 575 to obtain the desired oversize load data. After the data is merged the disclosed process/system is for certain purposes finished. The process/system can write the oversized data to an appropriate register file 565, or perform other processes and operations.

While the embodiment described above was directed toward oversize octword (thirty-two (32) byte) store and load operation(s), it can be appreciated that other oversize store and load operation(s) can be configured, and the store queue and dataflow can be configured to handle different data width sizes (e.g., 32 or 40 bytes), and can be configured so that the store queue data width and dataflow through the LSU are other sizes or portions, e.g., a third or quarter, of the size of the data that can be processed by the processor. For example, instead of the data field of the store queue being half the width of the data that can be handled by the processor, each store queue entry can be one third or one quarter of the data width of the data handled by the processor and three, four, or more passes through the LSU datapipe 500 can be undertaken to obtain the desired data. It should also be appreciated from an efficiency standpoint that it may be best to have the data field in the store queue and through the pipeline to be configured to handle an even multiple of the data width that the processor is capable of processing, however, the capability of the processor does not have to be an even multiple of the data size in the store queue. For example, the second (or latter) pass(es) through the pipeline does not have to obtain a full data field from the store queue.

Figure 6:
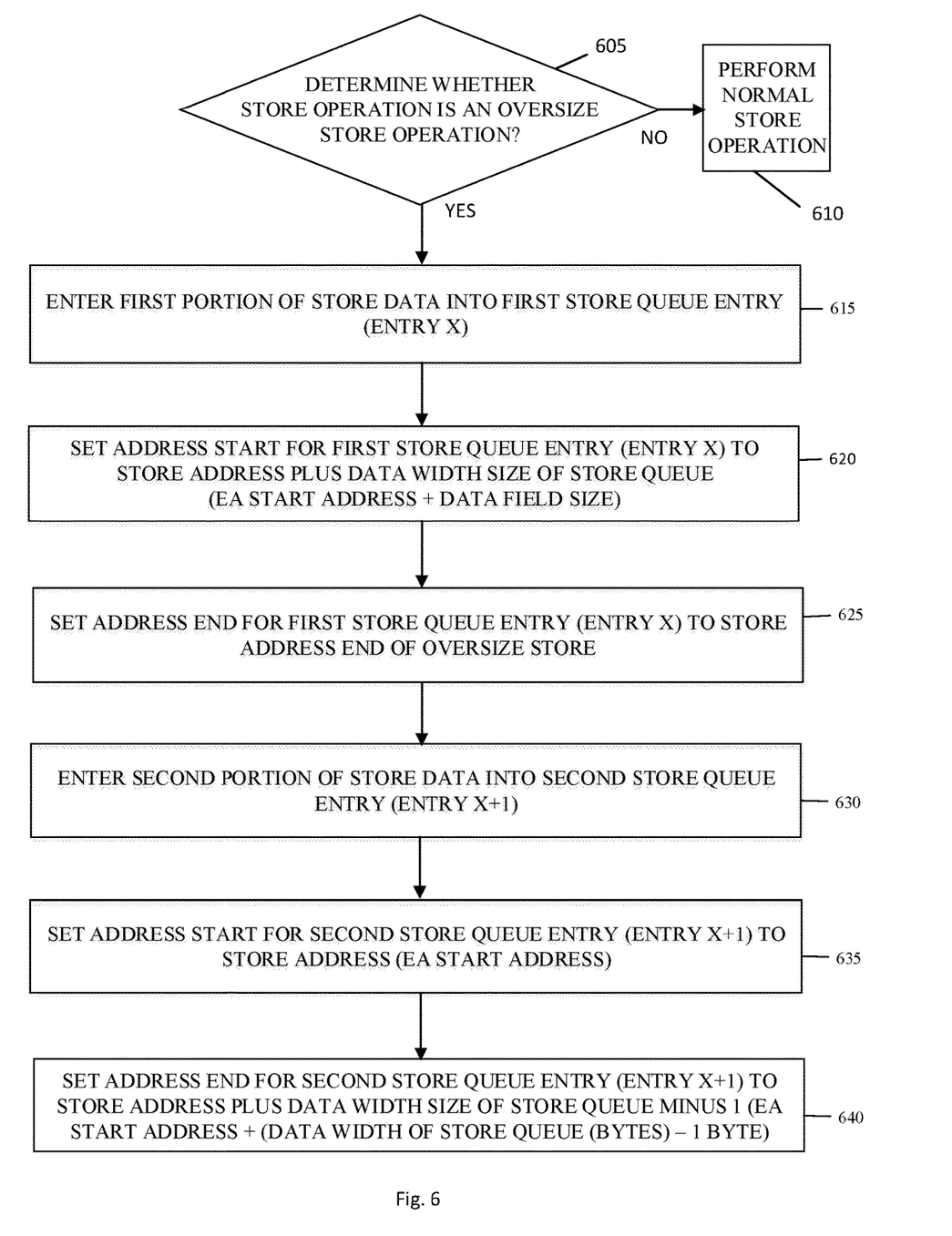
FIG. 6 illustrates a flow chart of an illustrative method of processing or handling data in a processor; and in an embodiment, of handling oversized store operations in a load store execution unit (LSU) of a processor.

FIG. 6 is an exemplary flowchart in accordance with one embodiment illustrating and describing a method of handling instructions in an information handling system, and more specifically a method of handling oversize store operations. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

Method 600 of handling instructions in a processor includes, in an embodiment, a method of handling an oversized store operation where the data width of the desired store is larger than the data width of the data field in a store queue. At 605 it is determined whether or not the store operation, e.g., store instruction (stag), is for an oversize store operation. If the store is not for an oversize store operation (605: No), then the process continues to 610 where a non-oversized store operation is performed. If the store operation is for an oversize store operation (605: Yes), then the process 600 continues to 615 where the first portion, e.g., the first half, of the store data is written to or stored in a first store queue entry, e.g., Entry X.

The process 615 of writing the first portion of the store data into the first store queue, e.g. Entry X, includes in one or more embodiments at 620 setting the start address and at 625 setting the end address for the store queue Entry X. In one or more embodiments, the store start address (Store Start_EA) and the store end address (Store End_EA) are set for Entry X in respective fields 484 and 485 in store queue 380, and thereafter the data 487 is written to data field 486 for Entry X; and in alternative embodiments the data 487 is written into data field 486 for store queue Entry X, and thereafter the start address (Store Start_EA) and the end address (Store End_EA) where the store is to be written into memory are set (written) in the respective address fields 484 and 485 in store queue Entry X. In an embodiment where the store queue has a data width of sixteen (16) bytes, the oversize store is thirty-two (32) bytes, and the stores are written into two store queue entries (Entry X and Entry X+1), the store start address for the first entry (Entry X) of the store queue is the store address (EA) plus the width of the data field in the store queue, e.g., the store address plus sixteen (16) bytes (EA+16), and the store end address for the first entry (Entry X) of the store queue is the store address (EA) plus thirty-one (31) bytes (EA+31).

The process 600 continues to 630 where the second portion of the oversized store data is written to a second store queue entry, e.g., Entry X+1. In one or more embodiments, the second portion of the store operation is written to or stored in a second consecutive (adjacent) store queue Entry X+1. The process 630 of writing or storing the second portion of the oversized store data into a second store queue entry, Entry X+1, includes in one or more embodiments at 635 setting the store start address and at 640 setting the store end address for the store queue Entry X+1. In one or more embodiments, the store start address (EA) and the store end address (EA) are set (written) for Entry X+1 in respective fields 484 and 485 in store queue 380, and thereafter the data 487 is written to data field 486 for Entry X+1; and in alternative embodiments the data 487 is written into data field 486 for store queue Entry X+1, and thereafter the start address (EA) and the end address (EA) where the store is to be written into memory are set (written) in the respective address fields 484 and 485 for the store queue entry X+1. In an embodiment where the store queue has a data width of sixteen (16) bytes, the oversize store is thirty-two (32) bytes, and the stores are written into two store queue entries (Entry X and Entry X+1), the store start address for the second entry (Entry X+1) of the store queue, is the store address (EA), and the store end address for the second entry (Entry X+1) of the store queue is the store address (EA) plus the width of the data field in the store queue (16 bytes) minus 1 byte, i.e., EA plus (16−1) or (EA+15 bytes).

Figure 7:
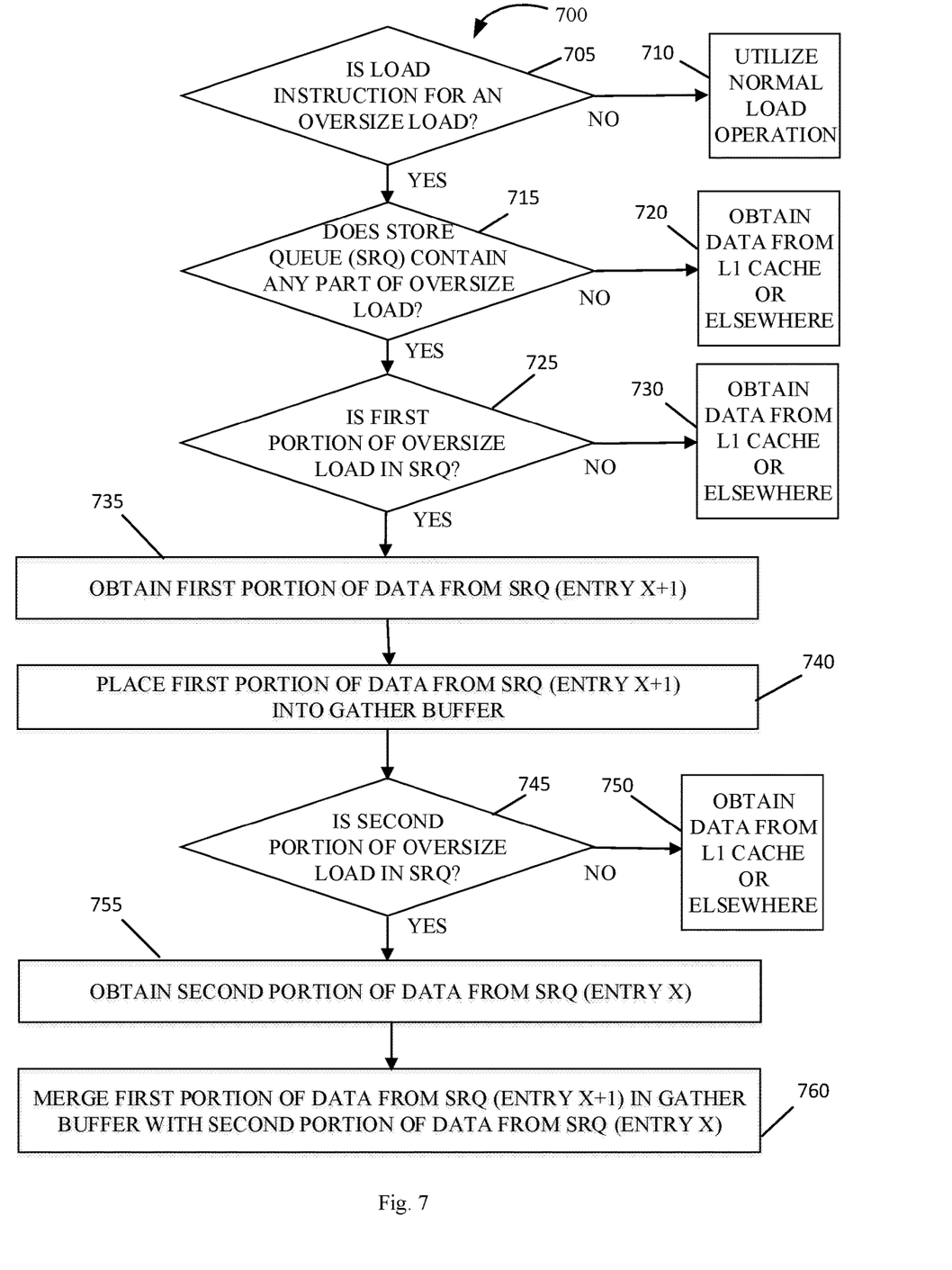
FIG. 7 illustrates a flow chart of an illustrative method of processing or handling data in a processor; and in an embodiment, of handling oversized load operations, and in an aspect of handling oversized store-forwarding operations in a load store execution unit (LSU) of a processor.

FIG. 7 is an exemplary flowchart in accordance with one embodiment illustrating and describing a method 700 of handling instructions in an information handling system, and more specifically a method of handling oversize load operations, and in an aspect of handling an oversized load operation as part of a store-forwarding operation. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

At 705 in process 700, it is determined whether or not the processor is processing a load instruction for an oversized load. That is, in an embodiment, a load operation where the load data has a larger width than the field in the store queue to hold data. If the load instruction is not for an oversized load (705: No), then the process 700 continues to 710 and a normal or standard load operation is undertaken. If the load instruction is for an oversized load (705: Yes), then the process continues to 715 where it is determined whether the store queue contains any part of the desired oversized load data. In an embodiment, the entries in the store queue are searched to determine whether or not they contain any of the data required for the oversize load operation. In an aspect, the store queues entries are searched to determine whether the store queue contains any of the required data for the oversize load operation by searching and comparing the memory address of the load instruction to the memory address in the store queue entries. In an embodiment, the store queue entries are searched and compared to the load address information to determine whether or not they contain any portion of the desired load data. In an embodiment, the store start address and store end address in the store queue entries are used to compare the load address information to determine if there is a match, hit, or overlap in one or more store queue entries. If the store queue does not contain any part or portion of the desired oversized load data (715: No), then the process continues to 720 where the desired data is obtained from the L1 data cache or elsewhere in the processor.

If the store queue contains any portion of the desired load data (715: Yes), then the process continues to 725 where it is determined whether a first portion (e.g., first half) of the desired load data is in the store queue. In one or more embodiments a search of the search queue is performed to determine whether any store queue entry contains a first portion (half) of the desired load data. In an aspect, the search to determine if any store queue entry contains the first portion (half) of the desired oversize load data is performed by reading memory address locations from the store queue entries (e.g., EA start and EA end addresses) and comparing them to parameters based upon the desired oversize load data (load address information). In an embodiment, the start address in one or more (preferably all) of the store queue entries is compared to a computed start address based upon the desired oversize load data and the configuration (data width) of the store queue. In an aspect, the computed start address (EA_start) for the first portion (half) of the desired oversize load based upon a store queue with a data field width of sixteen (16) bytes is the start EA of the oversize load address plus 16 bytes. If a first portion (half) of the desired oversize load is not within the store queue (SRQ) (725: No), then the process at 730 in an aspect proceeds to obtain the data from the L1 cache or elsewhere.

If the desired first portion (half) of the desired oversized load data is in the store queue (725: Yes), then at 735 obtain the first portion of data from that entry (referred to as Entry X+1) in the store queue and at 740 place that first portion of data from Entry X+1 in the store queue into a gather buffer to hold that data. Steps or blocks 725, 730, and 740 in an embodiment are preformed during a first pass through LSU pipe. At 745 the process proceeds to determine whether or not a second portion (half) of the desired oversized load is in the store queue. In one or more embodiments a search of the store queue is performed to determine whether any store queue entry contains a second portion (half) of the desired load data. In an embodiment the search is performed by reading memory address locations from the store queue entries (e.g., EA start and EA end addresses) and comparing them to parameters based upon the desired oversize load data (load address information). In an embodiment, the start address in one or more, preferably all, of the store queue entries is compared to the start address of the load, and the end address in one or more, preferably all, of the store queue entries is compared to an address based upon the configuration (data width) of the store queue. In an aspect, the computed end address (EA_end) is the start address of the load plus the data field width in bytes minus 1 byte, or the EA+15 bytes where the data field width is sixteen (16) bytes. If a second portion (half) of the desired oversize load is not within the store queue (SRQ) (745: No), then the process at 750 proceeds to obtain the data from the L1 cache or elsewhere.

If the desired second portion (half) of the oversized load is in an entry in the store queue, e.g., Entry X (745: Yes), then at 755 obtain the second portion (half) of the desired load data from Entry X. Steps or blocks 745 and 755 in an embodiment are performed during a second pass through the LSU pipe. In one or more embodiments, the first and second passes through the LSU pipe is tracked, managed, and controlled by a load launch queue LLQ, e.g., LLQ 572. At 760 merge the first portion (half) of the data from the Gather Buffer (the data from Entry X+1 from the store queue) with the second portion (half) of the data from Entry X of the store queue to obtain the oversized load data. In one or more aspects, the oversized data is written back to an appropriate register, e.g., a vector scalar register (VSR) in a vector scalar unit (VSU).

While the illustrative embodiments described above are preferably implemented in hardware, such as in units and circuitry of a processor, various aspects of the illustrative embodiments may be implemented in software as well. For example, it will be understood that each block of the flowchart illustration in FIGS. 6-7, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing information, the computer system comprising:
    at least one computer processor comprising:
        a load store execution unit (LSU) for processing load and store instructions, wherein the LSU comprises:
            a store queue having a plurality of entries for storing data, each store queue entry having a data field for storing the data, the data field having a maximum width for storing the data; and
            a gather buffer for holding data;
            wherein the at least one computer processor is configured to:
        process oversize data larger than the maximum width of the data field of the store queue,
        process an oversize load instruction for the oversize data by executing two passes through the LSU, a first pass through the LSU configured to store a first portion of the oversize data in the gather buffer and a second pass through the LSU configured to merge the first portion of the oversize data with a second portion of the oversize data.

2. The computer system of claim 1, wherein the at least one computer processor is further configured to store the oversize data in at least two consecutive entries in the store queue.

3. The computer system of claim 2, wherein the at least one computer processor is further configured so that the data field of the store queue is half a size of the oversize data capable of being processed by the at least one computer processor, the at least one computer processor configured to simultaneously store the oversize data in at least two entries in the store queue.

4. The computer system of claim 1, wherein the at least one computer processor is further configured to:
    obtain a copy of the first portion of the oversize data from a first entry of the plurality of entries in the store queue during a first pass through the LSU; and
    move the copy of the first portion of the oversize data to the gather buffer during the first pass through the LSU.

5. The computer system of claim 4, wherein the at least one computer processor is further configured to:
    obtain a copy of the second portion of the oversize data from a second entry of the plurality of entries in the store queue during a second pass through the LSU; and
    merge during the second pass through the LSU the copy of the second portion of the oversize data with the first portion of the oversize data from the gather buffer.

6. The computer system of claim 1, wherein the LSU further comprises a Load Launch Queue (LLQ), the LLQ having circuitry and logic for tracking and controlling load operations in the LSU, the LLQ configured to control the two passes through the LSU.

7. The computer system of claim 1, wherein the at least one computer processor is further configured to:
    detect the oversize load instruction for the oversize data that is larger than the maximum width of the data field in the store queue; and
    determine, in response to detecting the oversize load instruction, whether the store queue contains any of the oversize data.

8. The computer system of claim 7, wherein the at least one computer processor is further configured to:
    determine, in response to the store queue containing any of the oversize data, whether a first store queue entry in the plurality of entries contains all of the first portion of the oversize data; and
    obtain, in response to the first store queue entry containing all of the first portion of the oversize data, the first portion of the oversize data from the first store queue entry.

9. The computer system of claim 8, wherein the at least one computer processor is further configured to:
    determine whether a second store queue entry of the plurality of entries contains all of the second portion of the oversize data; and obtain, in response to the second store queue entry containing all of the second portion of the oversize data, the second portion of the oversize data from the second store queue entry.

10. The computer system of claim 8, wherein the at least one computer processor is further configured to:
compare memory address information in each of the plurality of entries to a first half of a memory address contained in the oversize load instruction to determine whether the first store queue entry contains all of the first portion of the oversize data; and
compare memory address information in each of the plurality of entries to a second half of the memory address contained in the oversize load instruction to determine whether a second store queue entry contains all of the second portion of the oversize data.

11. The computer system of claim 7, wherein the at least one computer processor is further configured to compare memory address information in each of the store queue entries with a memory address contained within the oversize load instruction to determine whether any store queue entry contains any of the oversize data.

12. The computer system of claim 11, wherein the at least one computer processor is further configured to determine whether a store start address and a store end address of each store queue entry falls within an oversize load start address and an oversize load end address range of the oversize load instruction to determine whether any store queue entry contains any of the oversize data.

13. A method of processing data in a processor, comprising:
detecting an oversize load instruction for oversize data that is larger than a maximum width of a data field in a store queue;
determining, in response to detecting the oversize load instruction, whether the store queue contains any of the oversize data;
determining, in response to the store queue containing any of the oversize data, whether a first store queue entry contains all of a first portion of the oversize data;
obtaining, in response to the first store queue entry containing all of the first portion of the oversize data, the first portion of the oversize data from the first store queue entry by executing a first pass through the load store unit (LSU);
storing the first portion of the oversize data from the first store queue entry into a gather buffer; and
merging the first portion of the oversize data from the gather buffer with a second portion of the oversize data obtained by executing a second pass through the LSU.

14. The method according to claim 13, wherein merging the first portion of the oversize data from the gather buffer with the second portion of the oversize data further comprises:
determining whether a second store queue entry contains all of the second portion of the oversize data; and
obtaining, in response to the second store queue entry containing all of the second portion of the oversize data, the second portion of the oversize data from the second store queue entry.

15. The method according to claim 13, wherein in response to determining that all of one of the first portion or the second portion of the oversize data is not in a store queue entry, obtaining all of the first portion or the second portion of the oversize data that is not in a store queue entry from a data cache.

16. The method according to claim 13, wherein determining whether the store queue contains any of the oversize data includes comparing memory address information in each store queue entry with a memory address referred to in the oversize load instruction.

17. The method according to claim 16, wherein comparing the memory address information in each store queue entry with the memory address referred to in the oversize load instruction includes determining whether a store start address and a store end address in each store queue entry falls within an oversize load start address and an oversize load end address range of the oversize load instruction.

18. The method of claim 13, further comprising simultaneously storing oversize data in two consecutive store queue entries.

19. A computer system for processing information, the computer system comprising:
at least one processor;
a load store execution unit (LSU) for processing load and store instructions, the LSU comprising (a) a store queue having a plurality of entries for storing data, each store queue entry having a data field for storing data, the data field having a maximum width for storing data, (b) a gather buffer for holding data, and (c) a Load Launch Queue (LLQ) for managing and controlling load instructions in the LSU;
one or more computer readable non-transitory storage media; and
programming instructions stored on the one or more computer readable non-transitory storage media for execution by the at least one processor, the programming instructions comprising:
programming instructions to process oversize data larger than the maximum width of the data field of the store queue;
programming instructions to store the oversize data in at least two consecutive entries in the store queue; and
programming instructions to process an oversize load instruction for the oversize data by executing two passes through the LSU, a first pass through the LSU to store a first half of the oversize data in the gather buffer and a second pass through the LSU to merge the first half of the oversize data from the gather buffer with a second half of the oversize data obtained by the second pass through the LSU.

* * * * *